United States Patent
Hickman et al.

(10) Patent No.: US 8,831,366 B1
(45) Date of Patent: Sep. 9, 2014

(54) ENCODING AND COMPRESSING THREE-DIMENSIONAL (3D) OBJECT DATA MODELS

(71) Applicant: Google Inc., Mountain View, CA (US)

(72) Inventors: Ryan Hickman, Mountain View, CA (US); James J. Kuffner, Jr., Moutain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US); Won Chun, New York City, NY (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 13/673,994

(22) Filed: Nov. 10, 2012

Related U.S. Application Data (60) Provisional application No. 61/558,905, filed on Nov. 11, 2011.

(51) Int. Cl.
  *G06K 9/36* (2006.01)
  *G06K 9/46* (2006.01)
  *G06T 9/00* (2006.01)

(52) U.S. Cl.
  CPC ...................................... *G06T 9/001* (2013.01)
  USPC ....................................................... 382/232

(58) Field of Classification Search
  None
  See application file for complete search history.

(56) References Cited

U.S. PATENT DOCUMENTS

| | | | | |
|---|---|---|---|---|
| 5,736,987 | A * | 4/1998 | Drucker et al. | 345/420 |
| 6,373,489 | B1 * | 4/2002 | Lu et al. | 345/428 |
| 7,274,372 | B1 * | 9/2007 | Lake et al. | 345/582 |
| 8,515,982 | B1 * | 8/2013 | Hickman et al. | 707/758 |
| 8,525,846 | B1 * | 9/2013 | Hickman et al. | 345/581 |
| 2002/0050992 | A1 * | 5/2002 | Deering | 345/423 |
| 2002/0070932 | A1 * | 6/2002 | Kim | 345/419 |
| 2007/0297663 | A1 * | 12/2007 | Mundry | 382/131 |
| 2009/0284529 | A1 * | 11/2009 | De Aguiar et al. | 345/420 |
| 2010/0277479 | A1 * | 11/2010 | Lee et al. | 345/426 |
| 2011/0106507 | A1 * | 5/2011 | Lepage | 703/2 |
| 2012/0176478 | A1 | 7/2012 | Wang et al. | |
| 2012/0177283 | A1 | 7/2012 | Wang et al. | |

OTHER PUBLICATIONS

Taubin et al., "Geometric Compression Through Topological Surgery", ACM Transactions on Graphics, vol. 17, No. 2, Apr. 1998, pp. 84-115.*

(Continued)

*Primary Examiner* — Bhavesh Mehta
*Assistant Examiner* — Feng Niu
(74) *Attorney, Agent, or Firm* — McDonnell Boehnen Hulbert & Berghoff LLP (57) ABSTRACT

Methods and systems for encoding and compressing 3D object data models are provided. An example method may involve receiving 3D mesh data for an object that includes geometry coordinates for a surface of the object. Additionally, material properties may be associated with the geometry coordinates. The method may also include identifying multiple portions of the mesh data based on the material properties associated with the geometry coordinates. For example, a given group of adjacent geometry coordinates having common material properties may be identified as a given portion. For at least some of the identified portions of the mesh data, the method may further include encoding information related to an identified portion of the mesh data and compressing the encoded information into a file of compressed geometric data.

20 Claims, 7 Drawing Sheets

(56) References Cited

OTHER PUBLICATIONS

Autodesk 123D Catch, Catch and carry, Turn ordinary photos into extraordinary 3D models, www.123dapp.com/catch, 2013.

Won S. Chun, U.S. Appl. No. 13/075,069, filed Mar. 29, 2011.
Liang, "Geometry Compression", Mar. 29, 2011, http://graphics.stanford.edu/~sliang/CS448B_win00/sliang-cs448b-contrib.html.

* cited by examiner

ENCODING AND COMPRESSING THREE-DIMENSIONAL (3D) OBJECT DATA MODELS

CROSS-REFERENCE TO RELATED APPLICATIONS

This application claims the benefit of U.S. Provisional Application No. 61/558,905 filed on Nov. 11, 2011, the entirety of which is herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one example aspect, a method is provided that involves receiving three-dimensional mesh data representing at least a portion of an object. The three-dimensional mesh data may include geometry coordinates for a surface of the object having material properties associated with the geometry coordinates. The method may also include identifying multiple portions of the mesh data based on the material properties associated with the geometry coordinates. For example, a given group of adjacent geometry coordinates having common material properties may be identified as a given portion. For at least some of the identified portions of the mesh data, the method may further include encoding information related to an identified portion of the mesh data and compressing the encoded information into a file of compressed geometric data. The encoded information may include one or more appearance attributes and one or more reference libraries for rendering the one or more appearance attributes of the identified portion of the mesh data.

In another example aspect, a computer-readable medium having stored therein instructions, that when executed by a computing device, cause the computing device to perform functions is provided. The functions may involve receiving three-dimensional mesh data representing at least a portion of an object. The three-dimensional mesh data may include geometry coordinates for a surface of the object having material properties associated with the geometry coordinates. The functions may also include identifying multiple portions of the mesh data based on the material properties associated with the geometry coordinates. For example, a given group of adjacent geometry coordinates having common material properties may be identified as a given portion. The functions may further include, for at least some of the identified portions of the mesh data, encoding information related to an identified portion of the mesh data and compressing the encoded information into a file of compressed geometric data. The encoded information may include one or more appearance attributes and one or more reference libraries for rendering the one or more appearance attributes of the identified portion of the mesh data.

In still another example aspect, a system is provided that involves at least one processor and a memory coupled to the at least one processor. Additionally, instructions may be stored in the memory that are executable by the at least one processor to perform functions. The functions may involve receiving three-dimensional mesh data representing at least a portion of an object. The three-dimensional mesh data may include geometry coordinates for a surface of the object having material properties associated with the geometry coordinates. The functions may also include identifying multiple portions of the mesh data based on the material properties associated with the geometry coordinates. For example, a given group of adjacent geometry coordinates having common material properties may be identified as a given portion. The functions may further include, for at least some of the identified portions of the mesh data, encoding information related to an identified portions of the mesh data and compressing the encoded information into a file of compressed geometric data. The encoded information may include one or more appearance attributes and one or more reference libraries for rendering the one or more appearance attributes of the identified portion of the mesh data.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is a schematic illustrating a conceptual partial view of an example computer program product that includes a computer program for executing a computer process on a

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for encoding and compressing three-dimensional (3D) object data models. An example method may include receiving three-dimensional mesh data of an object, and identifying multiple portions of the geometry of the object. For example, multiple portions may be identified based on material properties associated with geometry coordinates of the mesh data. In one example, a group of adjacent geometry coordinates having common material properties may be identified as a given portion. The common material properties may include common material shaders, texture maps, or other types of associated appearance information, for instance.

Additionally, for at least some of the identified portions of the mesh data, the method may include encoding information related to the identified portion of the object. For example, the encoded information may include geometry coordinates as well as surface normals, appearance attributes, and references to libraries configured to determine rendering effects for the identified portion. According to the method, the encoded information may be compressed for storage or transmission to a device. In some instances, the compressed information may be provided to an application of a device that is configured to render a representation of the object within a web browser. For instance, the compressed information may be retrieved and loaded as fragments of an object that are decompressed and compiled for display within the web browser.

Figure 1:
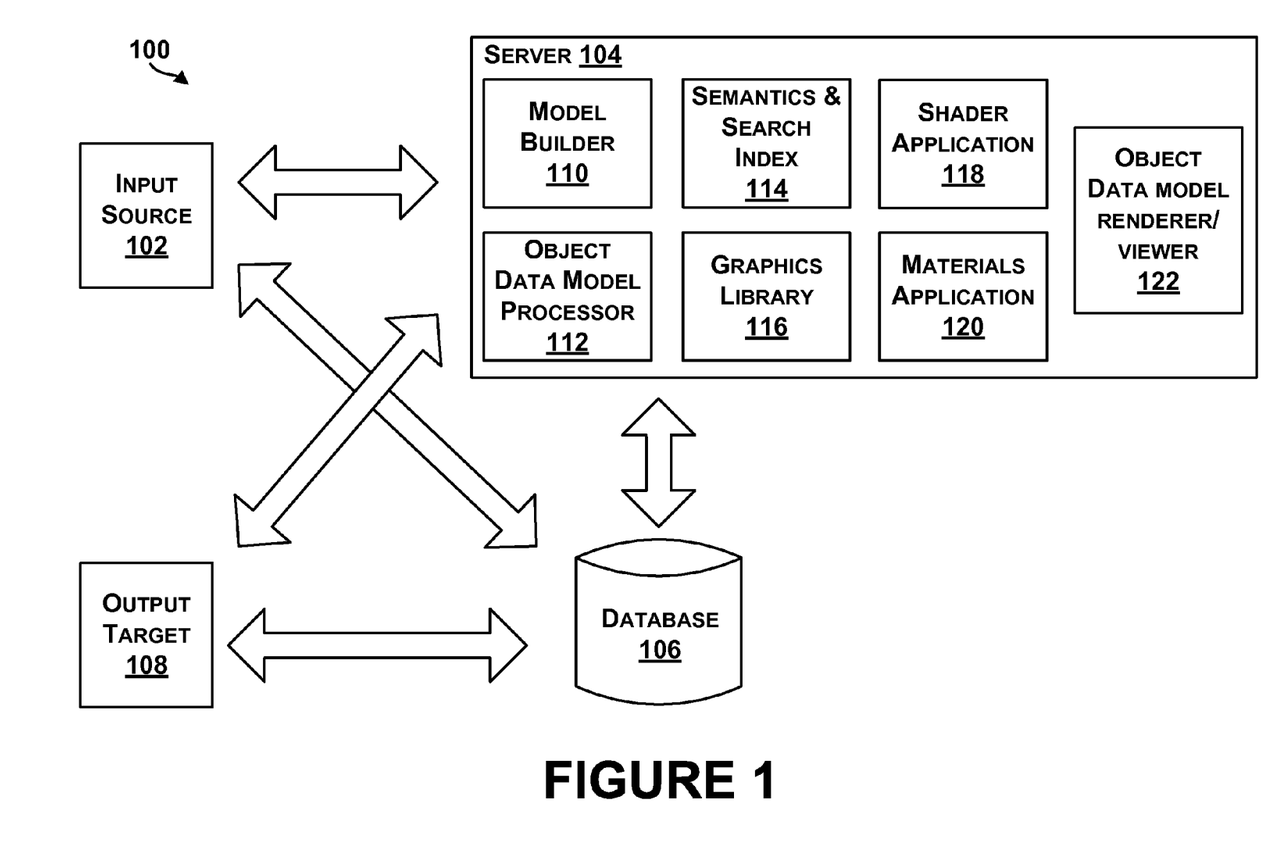
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image.

The database 106 may store all data sets for a 3D object data model in any number of various forms from raw, captured data to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
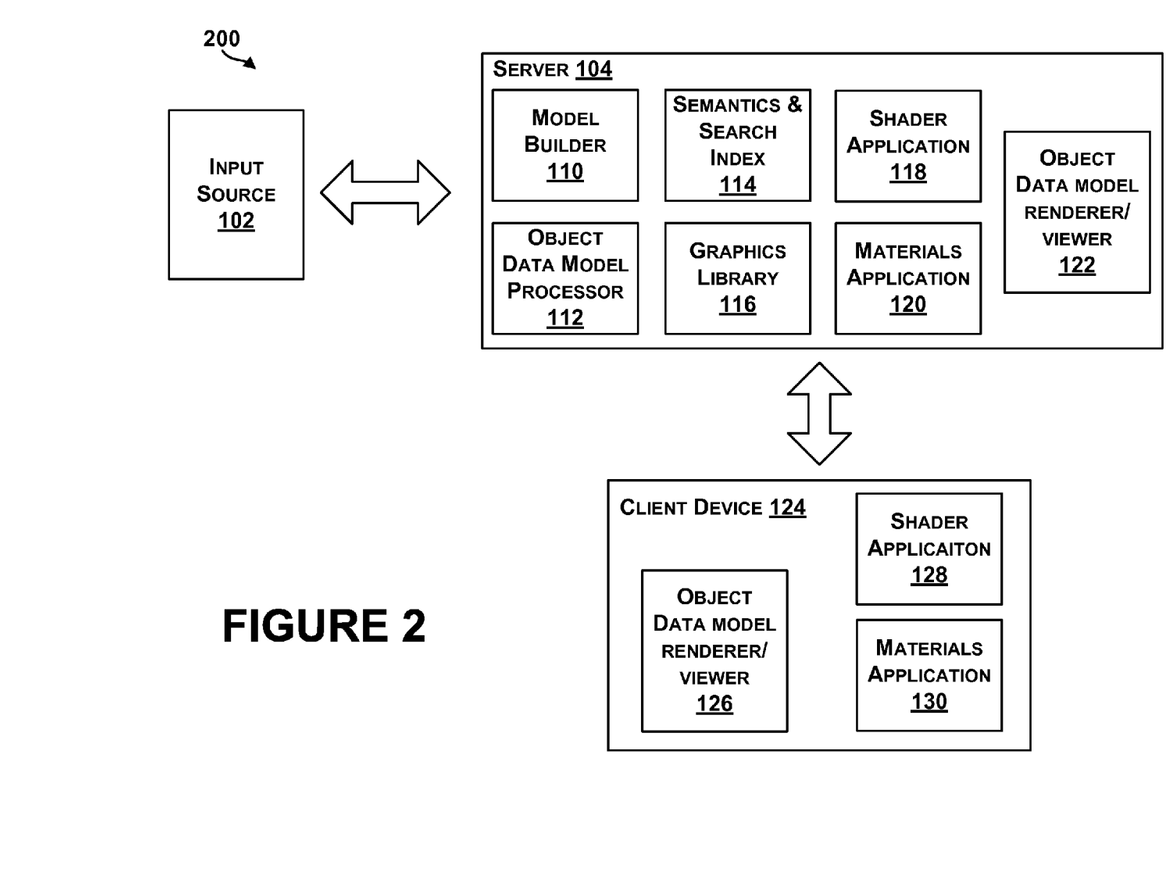
FIG. 2 illustrates another example system for object data modeling.

FIG. 2 illustrates another example system 200 for object data modeling. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw captured image data, mesh data, processed data, etc. Data of the 3D object data model may be encoded and compressed so as to store information related to geometry of an object and information related to appearance of the object for transmission and display within a web browser or other application on a device.

In one example, data of the 3D object data model may be initially encoded in order to represent a polygonal mesh and associated data as a list including a plurality of vertices and a plurality of indices. Each vertex in the list may have several arbitrary parameters associated with the vertex, including, but not limited to, position, surface normal, and texture coordinates. In one example, the triangle indices may be stored in a 16-bit unsigned integer format and the vertex attributes may be stored in a 32-bit floating point format. Additionally, the 32-bit floating point format vertex attributes may be quantized or reduced to 15-bits.

In instances in which compressed data is for a version of a web browser or application that does not have the ability to decompress dictionary encoded data, a delta compression may be used to store differences between the triangle indices and vertex attributes, either in an array of structures layout or a transposed layout. As a simple example, values of bytes may be stored as differences (i.e., deltas) between sequential values, rather than the values themselves. For instance an input of [100, 110, 107, 106, 115] may be stored as [100, 10, −3, −1, 9]. Other possible variants of delta compression are also possible and the example is not meant to be limiting.

After delta compression, post-delta data may be ZigZag encoded (e.g., using open-source Protocol Buffer library available from Google Inc.). Encoding may follow the format ZigZag(x): (x<<1)^(x>>15) with a corresponding decoding (during decompression) to follow the format UnZigZag(x): (x>>1)^(-(x & 1)). Since delta compression may create signed integers, ZigZag encoding may be used to map the signed integers into unsigned integers so that numbers with a small absolute value have a small variant encoded value too (rather than encoding negative values as very large unsigned integers). For example, −1 is encoded as 1, 1 is encoded as 2, −2 is encoded as 3, and so forth.

ZigZag encoding may be followed by multi-byte character encoding using UTF-8 encoding, for example. Finally, the multi-bye character encoded data may be compressed using GNU zip (Gzip), bzip2, or other types of file compression to generate a file of compressed geometric data.

In instances in which compressed data is for an application that does have the ability to decompress dictionary encoded data, a dictionary compression scheme may be used. For example, the Lempel-Ziv-Markov chain algorithm may be used. Subsequently, dictionary encoded data may also be compressed using Gzip, bzip2, or other types of file compression.

The file of compressed geometric data may be stored in a database, such as the database 106 in FIG. 1, in the server 104, or on the client device 124, for example. In some examples, the file of compressed geometric data may be provided by the server 104 to the client device 124 in response to a request from the client device 124. If using a web browser to view the 3D object data model, the client device 124 may decompress the file of compressed geometric data according to Java instructions provided in the object browser web page. A local copy of the object browser web page and a local copy of the uncompressed, geometric data can be stored in local memory of the client device 124. The client device 124 may also display exemplary screenshots of an initial default view of a 3D object, based on the geometric data and attributes associated with the geometric data loaded in the web browser.

Figure 3:
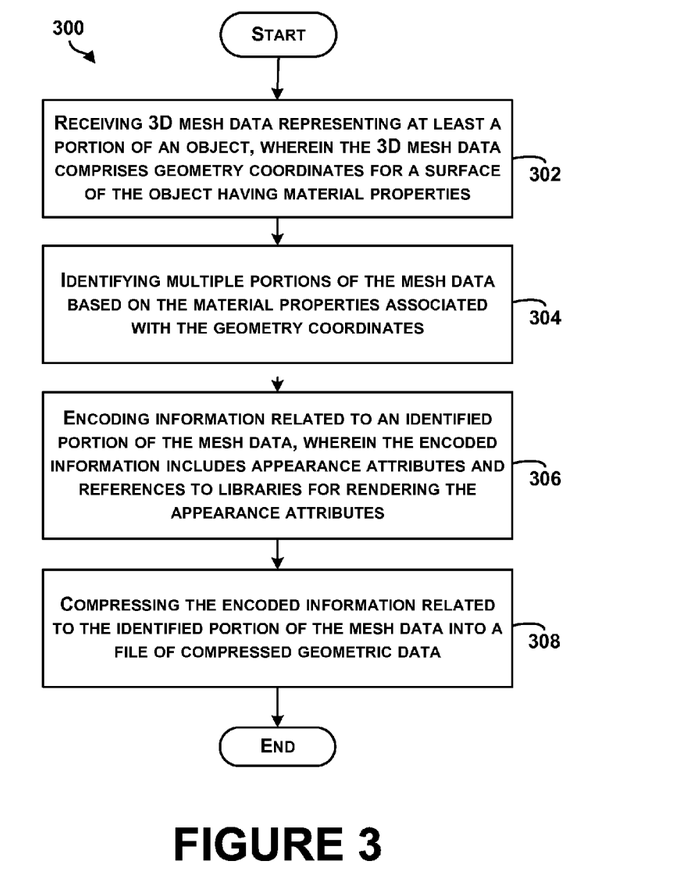
FIG. 3 is a block diagram of an example method for encoding and compressing three-dimensional (3D) object data models.

In some examples, data associated with a 3D object model may be sorted by material and divided into portions to be loaded as fragments and reassembled in portions by the client device. FIG. 3 is a block diagram of an example method 300 for encoding and compressing three-dimensional (3D) object data models. Method 300 shown in FIG. 3 presents an embodiment of a method that, for example, could be used with the system 100 or the system 200, for example, and may be performed by a device, such as any of the components illustrated in FIG. 1 or 2. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes receiving 3D mesh data representing at least a portion of an object. The 3D mesh data may include geometry coordinates for a surface of the object having material properties associated with the geometry coordinates. For example, the 3D mesh data may be a polygonal mesh (e.g., triangle mesh) including information identifying positions or coordinates of vertices as well as surface normals for the positions and material properties associated with the positions. In one instance, the material properties associated with the geometry coordinates of the 3D mesh data may include information identifying material types or appearance attributes for the geometry coordinates. For example, the information specifying a material type can be used as input to a shader library that provides the appropriate shader program, and the appearance attributes may be lighting values, texture coordinates, and or colors that are provided as inputs for a material shader. In another instance, the material properties associated with the geometry coordinates may be texture maps, such as diffuse maps, bump maps, opacity maps, glow maps, or specular maps.

In some examples, the 3D mesh data may be received from a database in a server. In other examples, the 3D mesh data may be received from a scanning device configured to capture information associated with the object (e.g., color and/or 3D position information). It is contemplated that the received mesh data may be received by a server and/or by a client device which performs the method 300.

At block 304, the method 300 includes identifying multiple portions of the mesh data based on the material properties associated with the geometry coordinates. For example, a computing device having a processor and a memory may identify portions of the mesh data based on common material properties among the received mesh data. In one instance, a given group of adjacent geometry coordinates having common material properties may be identified as a given portion. The geometry coordinates may be sorted by any number of categories, such as parts of the object, materials of the object, texture of the object, or any appearance of the object.

In one example, the received mesh data may include information identifying geometry coordinates that are associated with given portions. For example, the received mesh data may include geometry coordinates that are labeled with material properties that separate the object into multiple portions based on types of materials. Alternatively, the received mesh data may include information identifying a material type which can be used as input to a shader library to select an appropriate material shader program. For instance, a selected material shader program may be used for rendering various portions of the object. Thus, portions of the received mesh data may also be divided and identified based on geometry coordinates having a same material type or same material shader program (as selected by the shader library, e.g.).

Optionally, the identified portions may further be divided based on portions having a same material type or same material shader program and adjacent geometry coordinates (e.g., geometry coordinates that make up one or more corners of a polygon within the mesh data). In yet another example, the received mesh data may include information identifying texture maps associated with each of the geometry coordinates, and the geometry coordinates may be divided into portions based on geometry coordinates referencing the same texture map. Similarly, the identified portions may further be divided based on portions of the mesh data having the same texture map and adjacent geometry coordinates.

As a specific example, for mesh data representing a mobile phone, geometry of the mesh data may be identified as geometry pertaining to a screen, a rubber backing, a battery, a lens, etc. Geometry of the mesh data may additionally or alternatively be identified as having specific texture, color, appearance, etc. In one instance, two portions of the mobile phone, such as a camera lens and a flash lens, may be identified as having the same material type, and therefore identified as the same material type for purposes of rendering and/or compression. In another instance, two portions of the phone with a dissimilar material type, such as a camera lens and a screen, may nonetheless have the same material shader program selected from the shader library, and may therefore be identified as having the same material type for purposes of rendering and/or compression.

At block 306, the method 300 includes encoding information related to an identified portion of the mesh data. The encoded information may include one or more appearance attributes and one or more references to material shader program(s) for rendering the one or more appearance attributes. As described previously, for at least some of the identified portions of the object, the identified portions may be encoded into indexed polygonal data which takes the form of a list of a plurality of vertices and a plurality of indices. In some examples, the indexed polygonal data may be encoded using a dictionary-based encoding scheme. In other examples, the indexed polygonal data may be encoded using delta compression and ZigZag encoding. Thus, in some examples, identified portions within the received mesh data may be encoded to include geometry coordinates, appearance attributes, and references to material shader program(s) for determining rendering effects based on the appearance attributes.

At block 308, the method 300 includes compressing the encoded information related to the identified portion of the mesh data into a file of compressed geometric data. For example, the encoded information for a given portion may be compressed into a file of compressed geometric data using Gzip.

In some examples, the method 300 may also include determining a data file for the object that includes a list of the identified portions and files of compressed geometric data for the identified portions (or pointers to the files of compressed geometric data). The data file for the object may subsequently be provided to a computing device for rendering a representation of the object within a web browser. The computing device may receive the data file, and request that the files of compressed geometric data and material shaders be sent to the computing device. When the files of compressed geometric data are uncompressed, the computing device may determine and apply rendering effects for the geometry coordinates per a material basis, and assemble the identified portions to provide a representation of the object.

As one example, for a mobile phone comprising multiple parts, each part may be configured to be rendered using a separate or distinct shader for each material. A 3D object data model for the mobile phone may have geometry coordinates for a rubber backing, a lens, a metal frame, etc., and each portion of the 3D object data model may include information associated with an appropriate shader or material application. The 3D object data model may be divided into multiple portions, and encoded and compressed as described above, where portions of the model are grouped or divided depending on the material types of the portions, or depending on the material shader program that is selected by inputting the material type into the available shader library. The encoded and compressed multiple portions may be compiled into a data file for the mobile phone that may be provided to a computing device to facilitate efficient transmission of the 3D object data model for display within a web browser.

Figure 4:
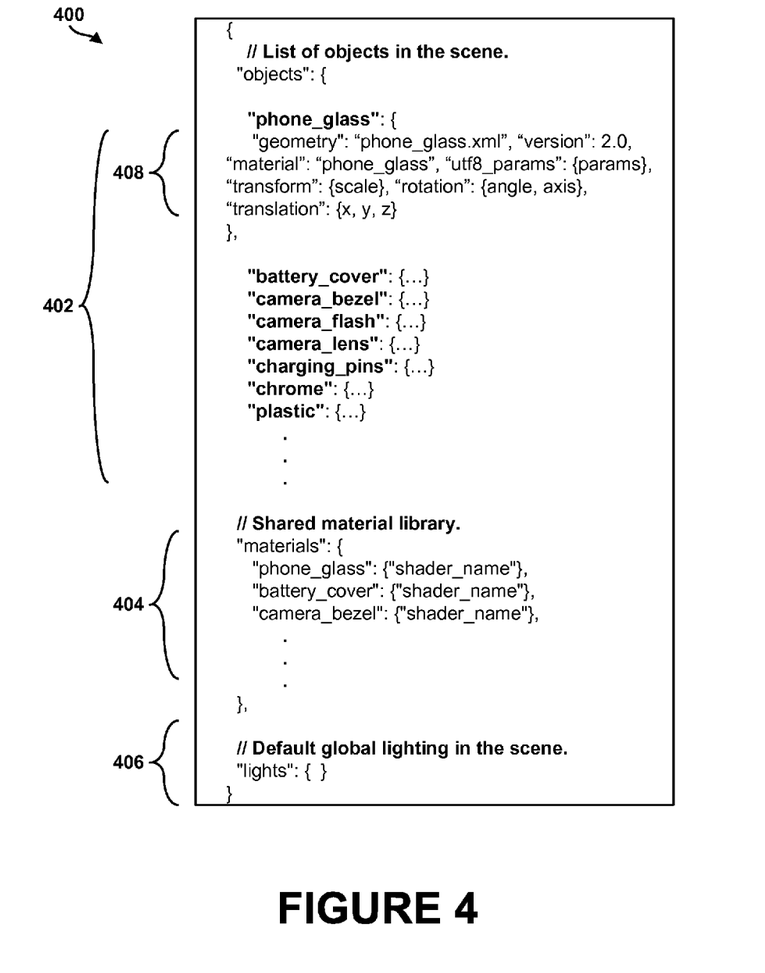
FIG. 4 illustrates an example format and structure of a data file for an object.

FIG. 4 illustrates an example format and structure of a data file 400 for an object. The data file 400 includes a list 402 of identified portions, a list 404 of libraries, and other attributes 406 of a scene for the object. In some examples, the data file 400 may be associated with a uniform resource locator (URL) such that the data file 400 may be retrieved by specifying a reference to the URL. Additionally, if a web browser is configured to allow cross-origin resource sharing, the URL may allow the data file 400 to be accessed from web pages of different domains.

The list 402 of identified portions may reference compressed geometric data for multiple specific portions of the object. For example, the data file 400 may describe a mobile phone, and the list 402 of identified portions may divide the raw geometry of the mobile phone into portions of the mobile phone, such as a phone glass, battery cover, camera bezel, camera flesh, camera lens, charging pins, chrome, plastic, etc.

The data file 400 may also include additional information specifying details of the identified portions. For example, an identified portion 408 directed to the phone glass also includes information as to geometry information for the phone glass, parameters or attributes of the phone glass, and transforms to apply to position the phone glass in the scene. In one example, geometry information, such as a file of compressed geometric data may be stored as an xml file. The parameters or attributes of the phone glass may describe material properties for the phone glass such as encoded and compressed appearance attributes. The transform may include a scale (e.g., one or more values in x, y, and/or z directions), rotation (e.g., an amount of rotation with respect to an axis of the scene), and a translation (e.g., amounts of movement in x, y, and/or z, directions with respect to a position of the scene). In some examples, decoding parameters for each attribute of the phone glass are also included for the identified portion 408.

The list 404 of libraries may be pointers to specific shaders, diffuse maps, or environment maps per object in the list 402 of identified portions. For example, the phone glass may be associated with a specific shader while the battery cover may be associated with a separate shader. A specific shader may be configured to determine rendering effects for an identified portion based on the encoded appearance attributes (e.g., after the encoded appearance attributes have been decoded).

In one example, the diffuse map may be specified as a bitmap image that may be wrapped onto the surface geometry of the object to add color to the object. Optionally, an environment map may be specified as a reflection image that is projected onto the surface geometry of the object to add a specular effect to the object. Other types of maps may also be described within the material library such as bump maps, opacity maps, glow maps, or specular maps. The other attributes 406 include information associated with other aspects of rendering a scene of the object, such as lighting, background images, camera position, animation, etc. In some instances the data file 400 may include a reference to another date file (not shown). For example, by specifying a URL of another data file, the data file may incorporate an additional object into the scene. As an example, the date file 400 may specify a URL as well as a transform for the referenced object.

Table 1 below illustrates another example data file 400 with further details and examples.

TABLE 1

```
{
  "version": 1.0,
  // UTF8 decoding scene-wide parameters.
  "decode_params": {"decodeOffsets": [−4108, −2985, −738, 0, 0, −511, −511, −511],
    "decodeScales": [0.000026, 0.000026, 0.000026, 0.000978, 0.000978, 0.001957, 0.001957,
0.001957]},
  // List of objects in the scene.
  "objects": {
    // All "Phone" Object model parts grouped by material and chunked by maximum vertex
    // array index of roughly 63000. Decoding parameters for each attribute of each part is stored
    // along with the part itself.
    "phone_glass": {
      "geometry": "phone_glass.xml", "version": 2.0, "material": "phone_glass", "utf8_params":
{"attribRange": [0, 42000], "indexRange": [336000, 14000], "bboxes": 378000, "names":
["phone_glass"], "lengths": [42000]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "battery_cover": {
      "geometry": "battery_cover.xml", "version": 2.0, "material": "battery_cover",
"utf8_params": {"attribRange": [0, 30080], "indexRange": [240640, 15040], "bboxes": 285760,
"names": ["prime_reduced_battery_cover_battery_cover1"], "lengths": [45120]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "camera_bezel": {
      "geometry": "camera_bezel.xml", "version": 2.0, "material": "camera_bezel",
"utf8_params": {"attribRange": [0, 33800], "indexRange": [270400, 11268], "bboxes": 304204,
"names": ["camera_bevel"], "lengths": [33804]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "camera_flash": {
      "geometry": "camera_flash.xml", "version": 2.0, "material": "camera_flash", "utf8_params":
{"attribRange": [0, 1937], "indexRange": [15496, 3264], "bboxes": 25288, "names":
["prime_cad_2_poly1:flash1"] "lengths": [9792]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "camera_lens": {
      "geometry": "camera_lens.xml", "version": 2.0, "material": "camera_lens",
"utf8_params": {"attribRange": [0, 1344], "indexRange": [10752, 672], "bboxes": 12768,
"names": ["prime_cad_2_poly1:primecamera"], "lengths": [2016]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "charging_pins": {
      "geometry": "charging pins.xml", "version": 2.0, "material": "charging_pins",
"utf8_params": {"attribRange": [0, 243], "indexRange": [1944, 336], "bboxes": 2952, names":
["charging_contacts"], "lengths": [1008]},
      "transform": {"scale": [ 5.0, 5.0, 5.0 ], "rotation": {"angle": 180, "axis": [ 0.0, 1.0, 0.0 ]
"translation": [ 0.0, −0.13, 0.0 ]}
    },
    "chrome": {
      "geometry": "chrome.xml", "version": 2.0, "material": "chrome", "utf8_params":
{"attribRange": [0, 7469], "indexRange": [59752, 9147], "bboxes": 87193, "names":
["usb_prong", "prime_cad_2_poly1:camera_ring2",
"prime_cad_2_poly1:camera_inner_ring1"], "lengths": [9969, 12096, 5376]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "plastic": {
      "geometry": "plastic.xml", "version": 2.0, "material": "plastic", "utf8_params":
{"attribRange": [0, 55294], "indexRange": [442352, 49779], "bboxes": 787834, "names":
["front_trim", "audio_jack", "power_button", "volume_controls", "usb_jack",
"prime_reduced_rear_trim_prime"] "lengths": [86784, 2880, 696, 828, 1446, 56703]},
      "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "plastic2": {
      "geometry": "plastic.xml", "version": 2.0, "material": "plastic", "utf8_params":
{"attribRange": [561689, 20647], "indexRange": [756865, 10323], "bboxes": 787870, "names":
["prime_reduced_rear_trim_prime"], "lengths": [30969]},
      "transform": {"scale": [ 5.0, 5.0, 5.0 ], "rotation": {"angle": 180, "axis": [ 0.0, 1.0, 0.0 ]},
```

TABLE 1-continued

```
"translation": [ 0.0, -0.13, 0.0 ]}
    },
    "speaker": {
        "geometry": "speaker.xml", "version": 2.0, "material": "speaker", "utf8_params":
{"attribRange": [0, 4124], "indexRange": [32992, 6506], "bboxes": 52510, "names":
["prime_reduced_front_speaker_prime", "rear_speaker"], "lengths": [5292, 14226]},
        "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
    },
    "screen": {
        "geometry": "screen.xml", "version": 2.0, "material": "screen", "utf8_params":
{"attribRange": [0, 247], "indexRange": [1976, 446], "bboxes": 3314, "names":
["prime_reduced_phone_screen_lcd_d_phone_screen_lcd_polysurface1"], "lengths": [1338]},
        "transform": {"scale": [ 5.0, 5.0, 5.0 ], "rotation": {"angle": 180, "axis": [ 0.0, 1.0, 0.0 ]},
"translation": [ 0.0, −0.13, 0.0 ]}
        }
    },
    // Shared material library.
    "materials": {"battery_cover": {"shader_name": "battery_cover", "diffuse_map":
["battery_cover-rgb.jpg"]},
        "camera_flash": {"shader_name": "camera_flash", "diffuse_map": ["camera_flash-rgb.jpg"],
"environment_map": "environment-rgb.jpg"},
        "camera_lens": {"shader_name": "camera_lens", "diffuse_map": ["camera_lens-rgb.jpg"],
"environment_map": "environment-light.png"},
        "camera_bezel": {"shader_name": "camera_bezel", "diffuse_map": ["camera_bezel-
rgb.jpg"]},
        "charging_pins": {"shader_name": "charging_pins", "diffuse map": ["charging_pins-
gb.jpg"], "diffuse_color": [135, 107, 0]},
        "chrome": {"shader_name": "chrome", "diffuse_map": ["chrome-rgb.jpg"], "diffuse_color":
[61, 61, 61], "environment_map": "environment-rgb.jpg"},
        "phone_glass": { "shader_name": "phone_glass", "diffuse_map": ["front_glass-rgb.jpg"],
"environment_map": "environment-light.png"},
        "plastic": {"shader_name": "plastic", "diffuse_map": ["plastic-rgb.jpg"], "diffuse_color": [53,
53, 53]},
        "screen": {"shader_name": "screen", "diffuse_map": ["screen-portrait-rgb.jpg", "screen-
landscape-rgb.jpg"], "environment_map": "environment-light.png"},
        "speaker": {"shader_name": "speaker", "diffuse_map": ["speaker-rgb.jpg"], "diffuse_color":
[28, 28, 28], "environment_map": "environment-rgb.jpg"
    },
    // Default global lighting in the scene.
    "lights": { }
}
```

Figure 5:
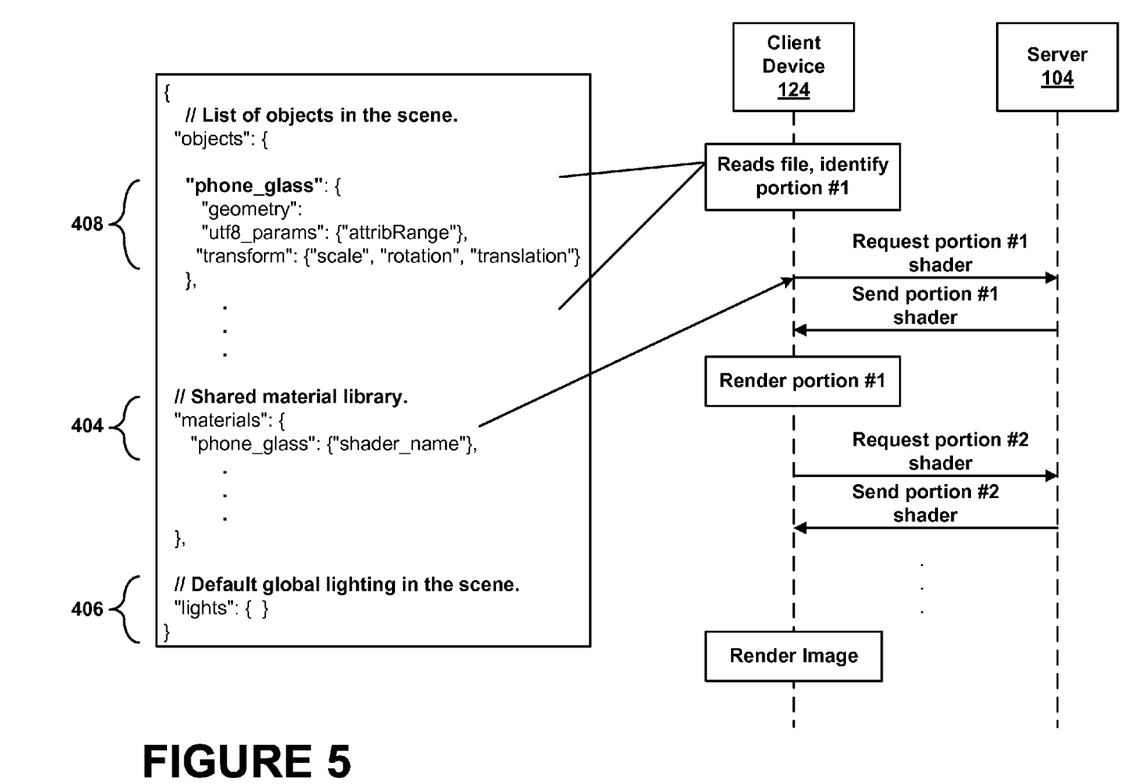
FIG. 5 illustrates a flow chart indicating an example process for rendering a representation of an object.

The data file 400 may be considered a scene file that includes information for how to render a scene of an object. FIG. 5 illustrates a flow chart 500 indicating an example process for rendering a representation of an object. As shown, the client device 124 may initially receive and read a scene document (e.g., the date file 400 of FIG. 4), and based on the identified portions and the identified material libraries, request a shader from the server 104. The client device 124 may continue to read the list of identified portions and continue to request shaders from the server 104 as needed. The client device 124 may render portions of the object of the scene document as material information is received, or may render the entire scene after receiving all material information for each identified portion of the 3D scene, for example.

Figure 6:
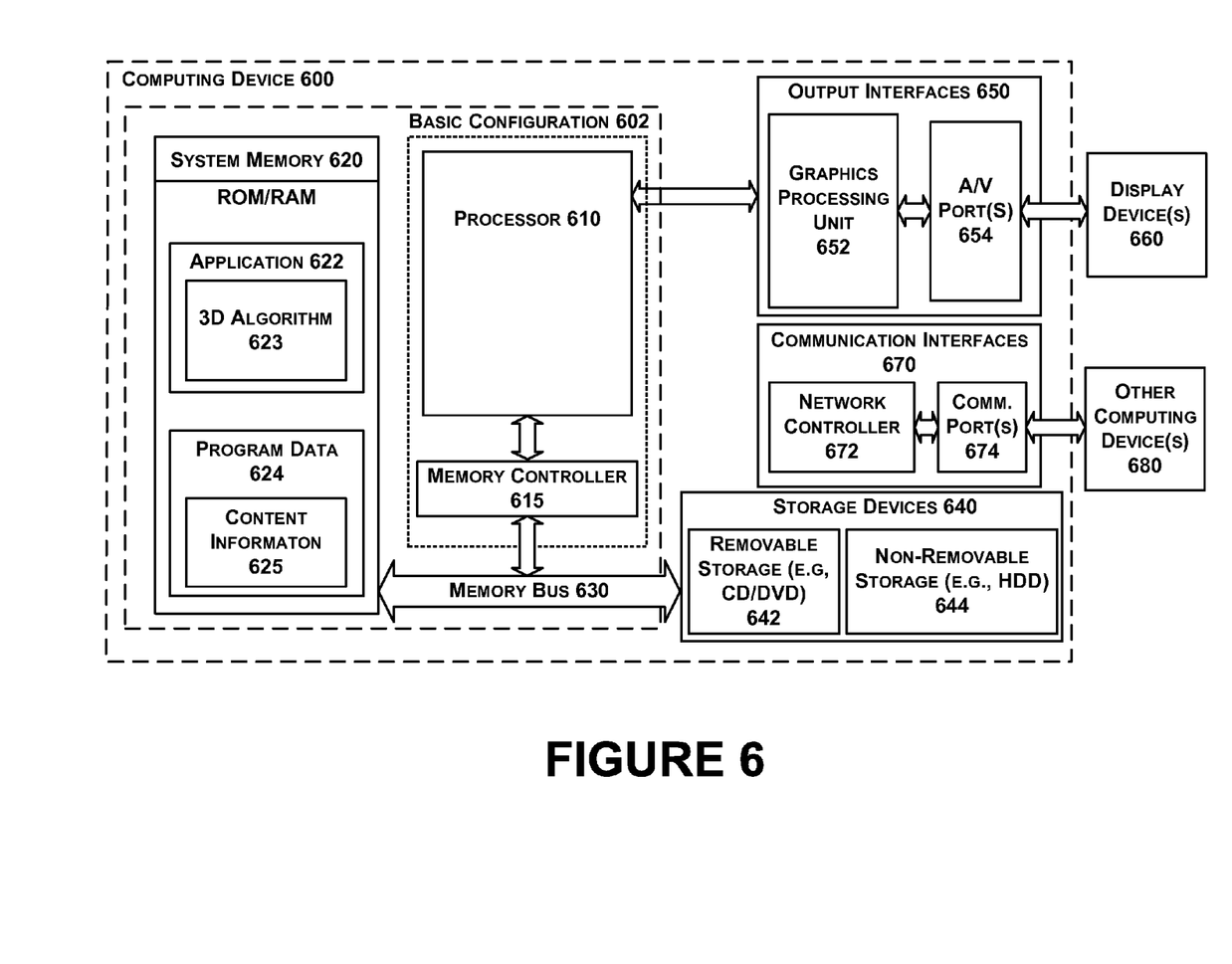
FIG. 6 is a functional block diagram illustrating an example computing device used in a computing system that is arranged in accordance with at least some embodiments described herein.

FIG. 6 is a functional block diagram illustrating an example computing device 600 used in a computing system that is arranged in accordance with at least some embodiments described herein. The computing device 600 may be a personal computer, mobile device, cellular phone, touch-sensitive wristwatch, tablet computer, video game system, or global positioning system, and may be implemented to provide a method for encoding and compressing 3D object data models as described in FIGS. 1-5. In a basic configuration 602, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (μP), a microcontroller (μC), a digital signal processor (DSP), or any combination thereof. A memory controller 615 can also be used with the processor 610, or in some implementations, the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 may include one or more applications 622, and program data 624. Application 622 may include a 3D algorithm 623 that is arranged to provide inputs to the electronic circuits, in accordance with the present disclosure. Program data 624 may include content information 625 that could be directed to any number of types of data. In some example embodiments, application 622 can be arranged to operate with program data 624 on an operating system.

Computing device 600 can have additional features or functionality, and additional interfaces to facilitate communications between the basic configuration 602 and any devices and interfaces. For example, data storage devices 640 can be provided including removable storage devices 642, non-removable storage devices 644, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 620 and storage devices 640 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of computing device 600.

Computing device 600 can also include output interfaces 650 that may include a graphics processing unit 652, which can be configured to communicate to various external devices such as display devices 660 or speakers via one or more A/V ports or a communication interface 670. The communication interface 670 may include a network controller 672, which can be arranged to facilitate communications with one or more other computing devices 680 over a network communication via one or more communication ports 674. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
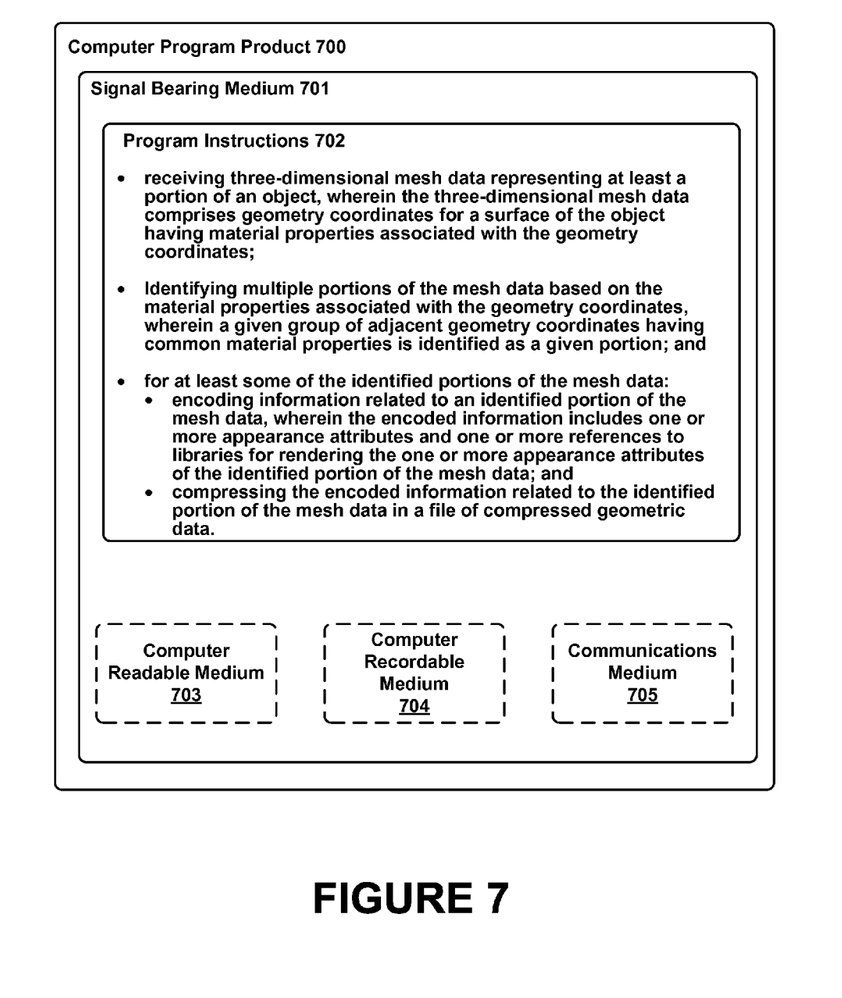

In some embodiments, the disclosed methods may be implemented as computer program instructions encoded on a non-transitory computer-readable storage media in a machine-readable format, or on other non-transitory media or articles of manufacture. FIG. 7 is a schematic illustrating a conceptual partial view of an example computer program product 700 that includes a computer program for executing a computer process on a computing device, arranged according to at least some embodiments presented herein.

In one embodiment, the example computer program product 700 is provided using a signal bearing medium 701. The signal bearing medium 701 may include one or more programming instructions 702 that, when executed by one or more processors may provide functionality or portions of the functionality described above with respect to FIGS. 1-6. In some examples, the signal bearing medium 701 may encompass a computer-readable medium 703, such as, but not limited to, a hard disk drive, a Compact Disc (CD), a Digital Video Disk (DVD), a digital tape, memory, etc. In some implementations, the signal bearing medium 701 may encompass a computer recordable medium 704, such as, but not limited to, memory, read/write (R/W) CDs, R/W DVDs, etc. In some implementations, the signal bearing medium 901 may encompass a communications medium 705, such as, but not limited to, a digital and/or an analog communication medium (e.g., a fiber optic cable, a waveguide, a wired communications link, a wireless communication link, etc.). Thus, for example, the signal bearing medium 701 may be conveyed by a wireless form of the communications medium 705 (e.g., a wireless communications medium conforming with the IEEE 802.11 standard or other transmission protocol).

The one or more programming instructions 702 may be, for example, computer executable and/or logic implemented instructions. In some examples, a computing device such as the computing device 600 of FIG. 6 may be configured to provide various operations, functions, or actions in response to the programming instructions 702 conveyed to the computing device 600 by one or more of the computer readable medium 703, the computer recordable medium 704, and/or the communications medium 705.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
    receiving three-dimensional mesh data representing at least a portion of an object, wherein the three-dimensional mesh data comprises geometry coordinates for a surface of the object having material properties associated with the geometry coordinates;
    identifying multiple portions of the mesh data based on the material properties associated with the geometry coordinates, wherein a given group of adjacent geometry coordinates having common material properties is identified as a given portion; and
    for at least some of the identified portions of the mesh data:
        encoding information related to an identified portion of the mesh data, wherein the encoded information includes one or more appearance attributes and one or more references to libraries for rendering the one or more appearance attributes of the identified portion of the mesh data; and
        compressing the encoded information related to the identified portion of the mesh data into a file of compressed geometric data.

2. The method of claim 1, further comprising determining a data file for the object, wherein the data file comprises a list of the identified portions having pointers to compressed geometric data for the identified portions.

3. The method of claim 2, further comprising providing the data file for the object to a computing device configured to render a representation of the object within a web browser.

4. The method of claim 1, wherein the one or more references to libraries for rendering the one or more appearance attributes comprise a reference to a shader configured to determine rendering effects based on the encoded one or more appearance attributes.

5. The method of claim 1, further comprising, for the at least some of the identified portions of the mesh data:
encoding the information related to the identified portion of the mesh data into indexed polygonal data representing the object as a list comprising a plurality of vertices and a plurality of indices;
storing, as encoded data, indicators of differences in the plurality of vertices for the plurality of indices from the indexed polygonal data; and
compressing the encoded data into the file of compressed geometric data.

6. The method of claim 1, wherein the material properties associated with the geometry coordinates comprise material shaders, and wherein the method further comprises identifying the multiple portions of the mesh data based on groups of adjacent geometry coordinates having a same material shader.

7. The method of claim 1, wherein the material properties associated with the geometry coordinates comprise texture maps, and wherein the method further comprises identifying the multiple portions of the mesh data based on groups of adjacent geometry coordinates having a same texture map.

8. A non-transitory computer-readable medium having stored therein instructions, that when executed by a computing device, cause the computing device to perform functions comprising:
receiving three-dimensional mesh data representing at least a portion of an object, wherein the three-dimensional mesh data comprises geometry coordinates for a surface of the object having material properties associated with the geometry coordinates;
identifying multiple portions of the mesh data based on the material properties associated with the geometry coordinates, wherein a given group of adjacent geometry coordinates having common material properties is identified as a given portion; and
for at least some of the identified portions of the mesh data:
encoding information related to an identified portion of the mesh data, wherein the encoded information includes one or more appearance attributes and one or more references to libraries for rendering the one or more appearance attributes of the identified portion of the mesh data; and
compressing the encoded information related to the identified portion of the mesh data into a file of compressed geometric data.

9. The non-transitory computer-readable medium of claim 8, wherein the functions further comprise determining a data file for the object, wherein the data file comprises a list of the identified portions having pointers to compressed geometric data for the identified portions.

10. The non-transitory computer-readable medium of claim 9, wherein the functions further comprise providing the data file for the object to a computing device configured to render a representation of the object within a web browser.

11. The non-transitory computer-readable medium of claim 8, wherein the one or more references to libraries for rendering the one or more appearance attributes comprise a reference to a shader configured to determine rendering effects based on the encoded one or more appearance attributes.

12. The non-transitory computer-readable medium of claim 8, wherein the functions further comprise, for the at least some of the identified portions of the mesh data:
encoding the information related to the identified portion of the mesh data into indexed polygonal data representing the object as a list comprising a plurality of vertices and a plurality of indices;
storing, as encoded data, indicators of differences in the plurality of vertices for the plurality of indices from the indexed polygonal data; and
compressing the encoded data into the file of compressed geometric data.

13. The non-transitory computer-readable medium of claim 8, wherein the material properties associated with the geometry coordinates comprise material shaders, and wherein the functions further comprise identifying the multiple portions of the mesh data based on groups of adjacent geometry coordinates having a same material shader.

14. The non-transitory computer-readable medium of claim 8, wherein the material properties associated with the geometry coordinates comprise texture maps, and wherein the functions further comprise identifying the multiple portions of the mesh data based on groups of adjacent geometry coordinates having a same texture map.

15. A system, comprising:
at least one processor;
a memory coupled to the at least one processor; and
instructions stored in the memory and executable by the at least one processor to perform functions comprising:
receiving three-dimensional mesh data representing at least a portion of an object, wherein the three-dimensional mesh data comprises geometry coordinates for a surface of the object having material properties associated with the geometry coordinates;
identifying multiple portions of the mesh data based on the material properties associated with the geometry coordinates, wherein a given group of adjacent geometry coordinates having common material properties is identified as a given portion; and
for at least some of the identified portions of the mesh data:
encoding information related to an identified portion of the mesh data, wherein the encoded information includes one or more appearance attributes and one or more references to libraries for rendering the one or more appearance attributes of the identified portion of the mesh data; and
compressing the encoded information related to the identified portion of the mesh data into a file of compressed geometric data.

16. The system of claim 15, wherein the functions further comprise determining a data file for the object, wherein the data file comprises a list of the identified portions having pointers to compressed geometric data for the identified portions.

17. The system of claim 15, wherein the one or more references to libraries for rendering the one or more appearance attributes comprise a reference to a shader configured to determine rendering effects based on the encoded one or more appearance attributes.

18. The system of claim 15, wherein the functions further comprise, for the at least some of the identified portions of the mesh data:
encoding the information related to the identified portion of the mesh data into indexed polygonal data representing the object as a list comprising a plurality of vertices and a plurality of indices;
storing, as encoded data, indicators of differences in the plurality of vertices for the plurality of indices from the indexed polygonal data; and compressing the encoded data into the file of compressed geometric data.

19. The system of claim 15, wherein the material properties associated with the geometry coordinates comprise material shaders, and wherein the functions further comprise identifying the multiple portions of the mesh data based on groups of adjacent geometry coordinates having a same material shader.

20. The system of claim 15, wherein the material properties associated with the geometry coordinates comprise texture maps, and wherein the functions further comprise identifying the multiple portions of the mesh data based on groups of adjacent geometry coordinates having a same texture map.

* * * * *